(12) United States Patent
Jung

(10) Patent No.: US 6,810,071 B2
(45) Date of Patent: Oct. 26, 2004

(54) CODE DIVISION MULTIPLE ACCESS (CDMA) CODE TIMING TRACKING APPARATUS

(75) Inventor: Min Soo Jung, Seoul (KR)

(73) Assignee: Hyundai Electronics Ind. Co., Ltd., Kyungki-Do (KR)

(*) Notice: Subject to any disclaimer, the term of this patent is extended or adjusted under 35 U.S.C. 154(b) by 767 days.

(21) Appl. No.: 09/846,951

(22) Filed: May 1, 2001

(65) Prior Publication Data
US 2002/0163957 A1 Nov. 7, 2002

(30) Foreign Application Priority Data
Jun. 24, 2000 (KR) ........................................ 2000-35076

(51) Int. Cl.$^7$ ................................................. H04B 1/69
(52) U.S. Cl. .................... 375/142; 375/140; 375/150; 375/148; 375/149; 375/134; 370/320
(58) Field of Search ................................. 375/140, 150, 375/148, 149, 134, 200; 370/320

(56) References Cited

U.S. PATENT DOCUMENTS

| | | | | |
|---|---|---|---|---|
| 5,696,762 A | * | 12/1997 | Natali et al. | 370/320 |
| 5,737,362 A | * | 4/1998 | Hyun et al. | 375/149 |
| 5,832,023 A | * | 11/1998 | Latva-aho | 375/148 |
| 5,991,330 A | | 11/1999 | Dahlman et al. | 375/200 |
| 6,128,329 A | * | 10/2000 | Takakusaki | 375/140 |
| 6,201,828 B1 | * | 3/2001 | El-Tarhuni et al. | 375/150 |
| 6,205,167 B1 | * | 3/2001 | Kamgar et al. | 375/134 |
| 6,633,603 B2 | * | 10/2003 | Bultan et al. | 375/148 |

* cited by examiner

Primary Examiner—Stephen Chin
Assistant Examiner—Sudhanshu C. Pathar
(74) Attorney, Agent, or Firm—Baker Botts LLP

(57) ABSTRACT

Disclosed is a CDMA (Code Division Multiple Access) code timing tracking apparatus capable of exact code timing synchronization without regard to signal gain change by normalizing signal gain to synchronize code timing. The CDMA code timing tracking apparatus correlates each code generated from a PN code generator, which generates on-time code, early code being faster than the on-time code and late code being later than the on-time code, with CDMA signal, low-pass filters output signal of a plurality of correlators with first to third low-pass filters and quantizes output signal of the first low-pass filter. Furthermore, the CDMA code timing tracking apparatus subtracts output signal of the third low-pass filter from output signal of the second low-pass filter, generates difference signal, divides the difference signal by output signal of a quantizer and generates the resulted value as error signal to compensate error, thereby obtaining exact CDMA code timing tracking without regard to the size of input signal.

13 Claims, 11 Drawing Sheets

CODE DIVISION MULTIPLE ACCESS (CDMA) CODE TIMING TRACKING APPARATUS

BACKGROUND OF THE INVENTION

1. Field of the Invention

The present invention relates to a CDMA (Code Division Multiple Access) code timing tracking in a CDMA type mobile communication system (i.e., a cellular communication system, a personal communication system or an IMT (International Mobile Telecommunication)-2000). More particularly, the present invention relates to a CDMA code timing tracking apparatus capable of exact code timing synchronization without regard to signal gain change by normalizing signal gain to synchronize code timing.

2. Description of the Related Art

In general, a CDMA (Code Division Multiple Access) is a method to enlarge frequency band of data signal with diffusion code, and then restores to original signal using the same diffusion signal. The CDMA method has several advantages that it is good for communication security and can effectively deal with multiple path signal attenuation.

In case of a CDMA type receiver, the receiver uses the same diffusion code as a transmitter and can restore to exact signal only when code phase of the received diffusion code and phase of diffusion code generated inside the receiver must correspond with each other.

As the algorithm for corresponding such code phase or timing synchronization, there are DLLs (Delay Locked Loops) using correlation value between early code, which is faster than on-time code, and late code, which is later than the on-time code, and TDLs (Tau-Dither Loops) using only one correlator.

Conventional synchronous DLLs, asynchronous DLLs, synchronous TDLs and asynchronous TDLs change speed for convergence of code phase synchronization according to the size change of signal.

FIG. 1 shows spreading code (PN Sequence) used for restoring CDMA code when the receiver of the conventional CDMA type mobile communication system applies the DLL.

Here, FIG. 1a shows on-time spreading code, FIG. 1b shows early code, which is /2 as fast as the on-time, and FIG. 1c shows late code which, is /2 as late as the on-time.

The on time means timing in the case of corresponding with the PN code phase of received signal.

The difference subtracting correlation value of the early code and received signal from correlation value of the late code and received signal is error signal being in proportion to code timing error.

The code timing synchronization using the DLL is to adjust the phase of spreading code to minimize error signal. The DLL is classified into two groups: one being a synchronous DLL performing in the state of restoring phase with carrier and the other being an asynchronous DLL performing without regard to phase restoration with carrier frequency.

FIG. 2 shows a structure of the synchronous DLL in the conventional CDMA type mobile communication system.

The synchronous DLL includes a PN code generator 11 for generating early code, which is faster than on-time code, and late code, which is later than the on-time code, a first correlator 12 for correlating the early code generated from the PN code generator 11 with baseband CDMA signal, which is input, a second correlator 13 the late code generated from the PN code generator 11 with the baseband CDMA signal, first and second low-pass filters for low-pass filtering signal output from the first and second correlators 12 and 13 respectively, a subtracter 16 for subtracting the output signal of the second low-pass filter 15 from output signal of the first low-pass filter 14 and generating difference signal, a third low-pass filter 17 for low-pass filtering the output signal of the subtracter 16, and a voltage-to-current converter 18 for converting voltage output from the third low-pass filter 17 into current and transmitting it to the PN code generator 11.

The synchronous DLL having the above structure generates early code, which is faster than on-time code, and late code, which is later than on-time code, and the first correlator 12 takes the correlation between the early code and the input baseband CDMA signal (r(t)).

Furthermore, the second correlator 13 takes the correlation between the late code generated from the PN code generator 11 and the baseband CDMA signal (r(t)). The first low-pass filter 14 low-pass filters output signal of the second correlator 13 and removes noise and high frequency element.

Next, the subtracter 16 subtracts the output signal of the second low-pas filter 15 from the output signal of the first low-pass filter 14 and generates difference signal, i.e., error signal in proportion to phase difference of spreading codes of the receiver and transmitter. The final role of the loop is to minimize error signal.

The output signal of the subtracter 16 is formularized as follows:

$$e(\tau) = p(\tau)R\left(\tau - \frac{1}{2}\Delta\right) - R\left(\tau + \frac{1}{2}\Delta\right), \quad \text{Formula 1}$$

wherein $p(\tau)$ is electric power of input signal, $R(\tau-\frac{1}{2}\Delta)$ is the output signal of the first correlator 12, $\tau$ is chip timing error and $\Delta$ is phase difference between early spreading code and late spreading code of the receiver. Here, $\Delta$ uses the length of one chip.

The output signal of the subtracter 16 is low-pass filtered in the third low-pass filter 17, converted into current in the voltage-to-current converter 18 and transmitted to the PN code generator 11.

Here, when the size of the input signal is not uniform and changed by noise and multiple path, also the size of error signal is changed according to the change in the size of electric power $P(\tau)$ of input signal. When error signal is changed, not only it has an influence on convergence time of the loop but also there is every probability that jitter is induced after the convergence.

FIG. 3 shows a structure of an embodiment of the asynchronous DLL in the conventional CDMA type mobile communication system.

The asynchronous DLL includes a PN code generator 20 for generating early code and late code, a first correlator 21 for correlating the early code generated from the PN code generator 20 with CDMA intermediate frequency signal which is input, a second correlator 22 for correlating the late code generated from the PN code generator 20 with the CDMA intermediate frequency signal, first and second band-pass filter 23 and 24 for band-pass filtering output signal of the first and second correlators 21 and 22 respectively, a first square unit 25 for squaring output signal of the first band-pass filter 23, a second square unit 26 for squaring output signal of the second band-pass filter 24, a subtracter 27 for subtracting output signal of the second square unit 26 from output signal of the first square unit 25 and generating difference signal, a low-pass filter 28 for low-pass filtering output signal of the subtracter 27, and a voltage-to-current converter 29 for converting voltage output from the low-pass filter 28 and transmitting it to the PN code generator 20.

The asynchronous DLL having the above structure generates early code, which is faster than on-time code, and late code, which is later than on-time code, in the PN code generator 20. The first correlator 21 takes the correlation between the early code and the CDMA intermediate frequency signal (r(t)).

Moreover, the second correlator 22 takes the correlation between the late code generated from the PN code generator 20 and the CDMA intermediate frequency signal (r(t)), the first band-pass filter 23 band-pass filters the output signal of the first correlator 21, and also the second band-pass filter 24 band-pass filters output signal of the second correlator 22.

Next, the first square unit 25 squares the output signal of the first band-pass filter 23, and the second square unit 26 squares the output signal of the second band-pass filter 24.

The subtracter 27 subtracts the output signal of the second multiplier 26 from the output signal of the first multiplier 25 and generates difference signal, i.e., baseband error signal. The final role of the loop is to minimize error signal.

The output signal of the subtracter 27 is formularized as follows:

$$e(\tau) = p^2(\tau)R^2\left(\tau - \frac{1}{2}\Delta\right) - R^2\left(\tau + \frac{1}{2}\Delta\right),\quad \text{Formula 2}$$

wherein $p^2(\tau)$ is electric power of input signal, $R^2(\tau-\frac{1}{2}\Delta)$ is the output signal of the second square unit, $R^2(\tau+\frac{1}{2}\Delta)$ is the output signal of the first square unit, $\tau$ is chip timing error and $\Delta$ is phase difference between the early spreading code and the late spreading code of the receiver. Here, $\Delta$ uses the length of one chip.

As shown in FIG. 2, as the size of input signal is changed in electric power $p(\tau)$ according to channel distortion or level change of signal, it has an influence on the converging effect of the asynchronous DLL.

Next, the output signal of the subtracter 27 is low-pass filtered in the low-pass filter 28, converted into current in the voltage-to-current converter 29 and transmitted to the PN code generator 20.

FIG. 4 shows a structure of another embodiment of the asynchronous DLL in the conventional CDMA type mobile communication system.

Differently from FIG. 3, in FIG. 4, baseband signal is input.

The asynchronous DLL includes a PN code generator 31 for generating early code and late code, a first correlator 32 for correlating the early code generated from the PN code generator 31 with baseband CDMA signal which is input, a second correlator 33 for correlating the late code generated from the PN code generator 31 with the input baseband CDMA signal, first and second low-pass filter 34 and 35 for low-pass filtering each output signal of the first and second correlators 32 and 33, a phase detector 40 for squaring each output signal of the first and second low-pass filters 34 and 35, subtracting the squared signal and generating error signal, a third low-pass filter 36 for low-pass filtering the output signal of the phase detector 40, and a voltage-to-current converter 37 for converting voltage output from the third low-pass filter 36 and transmitting it to the PN code generator 31.

The asynchronous DLL having the above structure generates early code, which is faster than on-time code, and late code, which is later than on-time code, in the PN code generator 31. The first correlator 32 takes the correlation between the early code and baseband CDMA signal (r(t)) which is input. Here, if the input signal is in QPSK (Quadriphase Phase Shift Keying) modulation, it may be divided into a real part element and an imaginary part element. Since the real part element and the imaginary part element pass the correlator at the same time, the first correlator 32 practically includes two multipliers, which output real part correlation value and imaginary part correlation value.

In the same way, also the second correlator 33 takes the correlation between the late code generated from the PN code generator 31 and the baseband CDMA signal (r(t)). If the input signal is in QPSK (Quadriphase Phase Shift Keying) modulation, it may be divided into a real part element and an imaginary part element. Since the real part element and the imaginary part element pass the correlator at the same time, the first correlator 32 practically includes two multipliers, which output real part correlation value and imaginary part correlation value.

The first low-pass filter 34 low-pass filters real part output signal and imaginary part output signal of the first correlator 32, and then transmits signal (E_re and E_im), from which noise and high frequency element are removed, to the phase detector 40.

Additionally, also the second low-pass filter 35 low-pass filters real part output signal and imaginary part output signal of the second correlator 33, and then transmits signal (L_re and L_im), from which noise and high frequency element are removed, to the phase detector 40.

The phase detector 40 squares four input signals respectively and adds by correlated signal. After that, the phase detector 40 subtracts obtained two signals and generates difference signal as error signal.

FIG. 5 shows an embodiment of the phase detector 40.

As shown in the drawing, the phase detector 40 includes first and second square units 41 and 42 for squaring real part output signal and imaginary part output signal of the first low-pass filter 34 respectively, third and fourth square units 43 and 44 for squaring real part output signal and imaginary part output signal of the second low-pass filter 35 respectively, a first adder 45 for adding output signal of the first and second square units 41 and 42, a second adder 46 for adding output signal of the third and fourth square units 43 and 44, and subtracter 47 for subtracting the output signal of the second adder 46 from the output signal of the first adder 45 and generating difference signal as error signal.

The phase detector 40 having the above structure squares real part output signal and imaginary part output signal output from the first low-pass filter 34 in the first and second square units 41 and 42 respectively. The first adder 45 adds the output signal of the first and second square units 41 and 42.

Furthermore, the third and fourth square units 43 and 44 square real part output signal and imaginary part output signal of the second low-pass filter 35 respectively. The second adder 46 adds the output signal of the third and fourth square units 43 and 44.

The subtracter 47 subtracts the output signal of the second adder 46 from the output signal of the first adder 45 and generates difference signal, i.e., error signal by the above formula 2.

Here, each of the square unit includes the multiplier inside.

Next, output signal of the phase detector 40 is low-pass filtered in the third low-pass filter 36, converted into current in the voltage-to-current converter 37 and transmitted to the PN code generator 31.

However, since the conventional asynchronous DLL for processing baseband signal uses a plurality of multipliers, each of which is more complex than the adder or the subtracter, there is problem that hardware implementation is complex.

SUMMARY OF THE INVENTION

It is, therefore, an object of the present invention to provide a CDMA (Code Division Multiple Access) code timing tracking apparatus capable of exact code timing synchronization without regard to signal gain change by normalizing signal gain to synchronize code timing.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
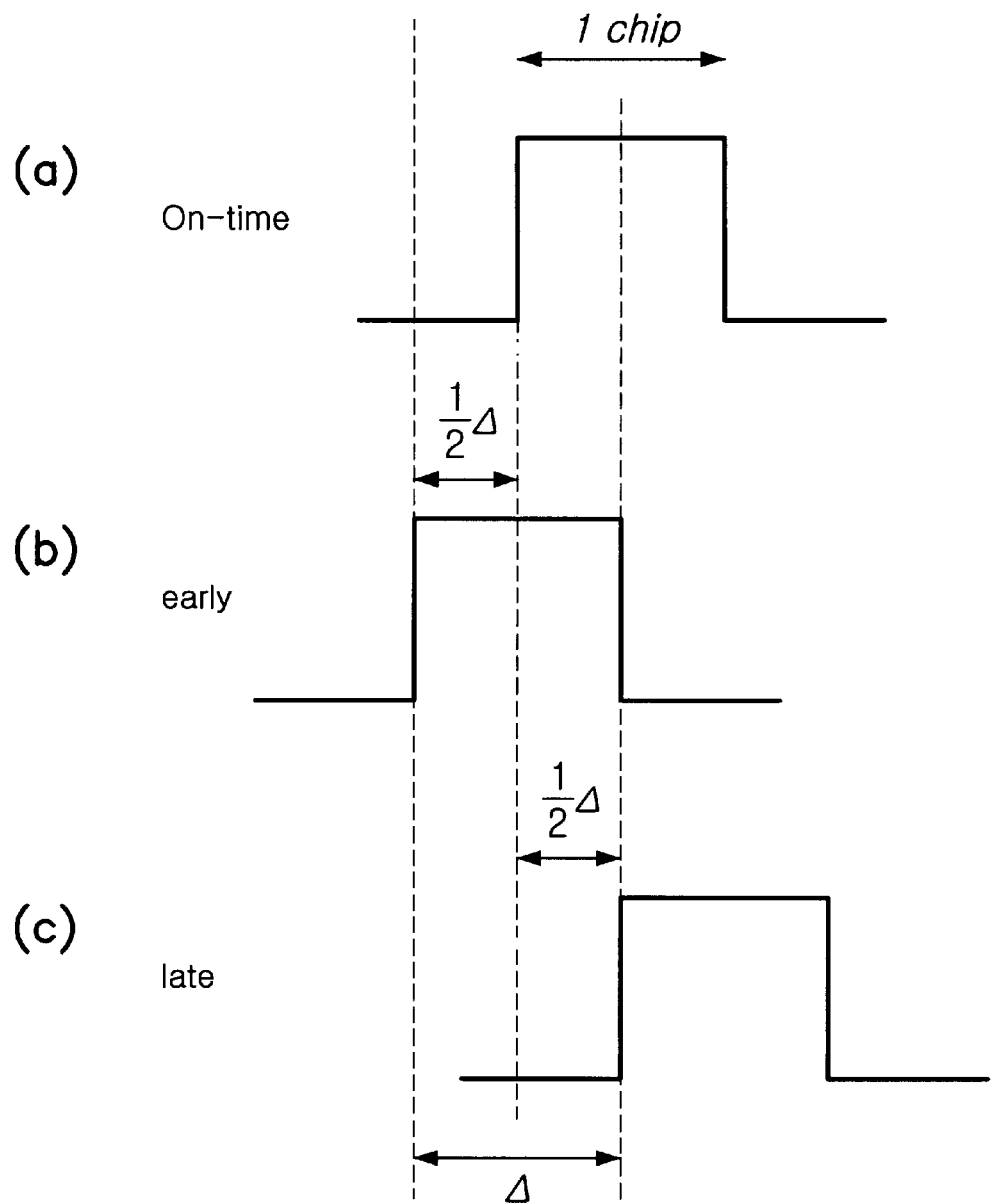
FIG. 1 is a view showing PN code phase in a typical CDMA (Code Division Multiple Access) type mobile communication system.
Figure 2:
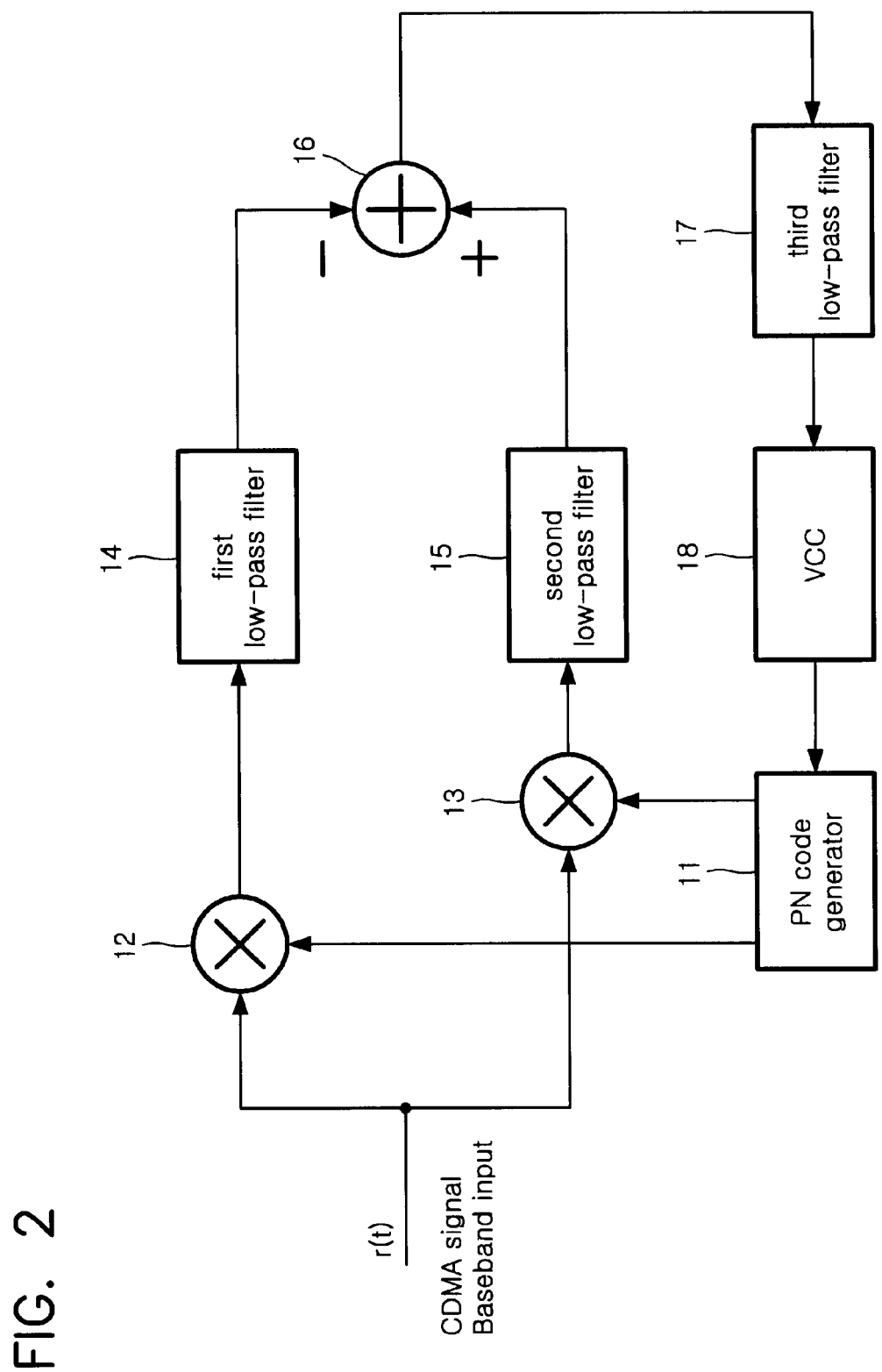
FIG. 2 is a view showing a structure of synchronous DLL (Delay Locked Loop) in the typical CDMA type mobile communication system.
Figure 3:
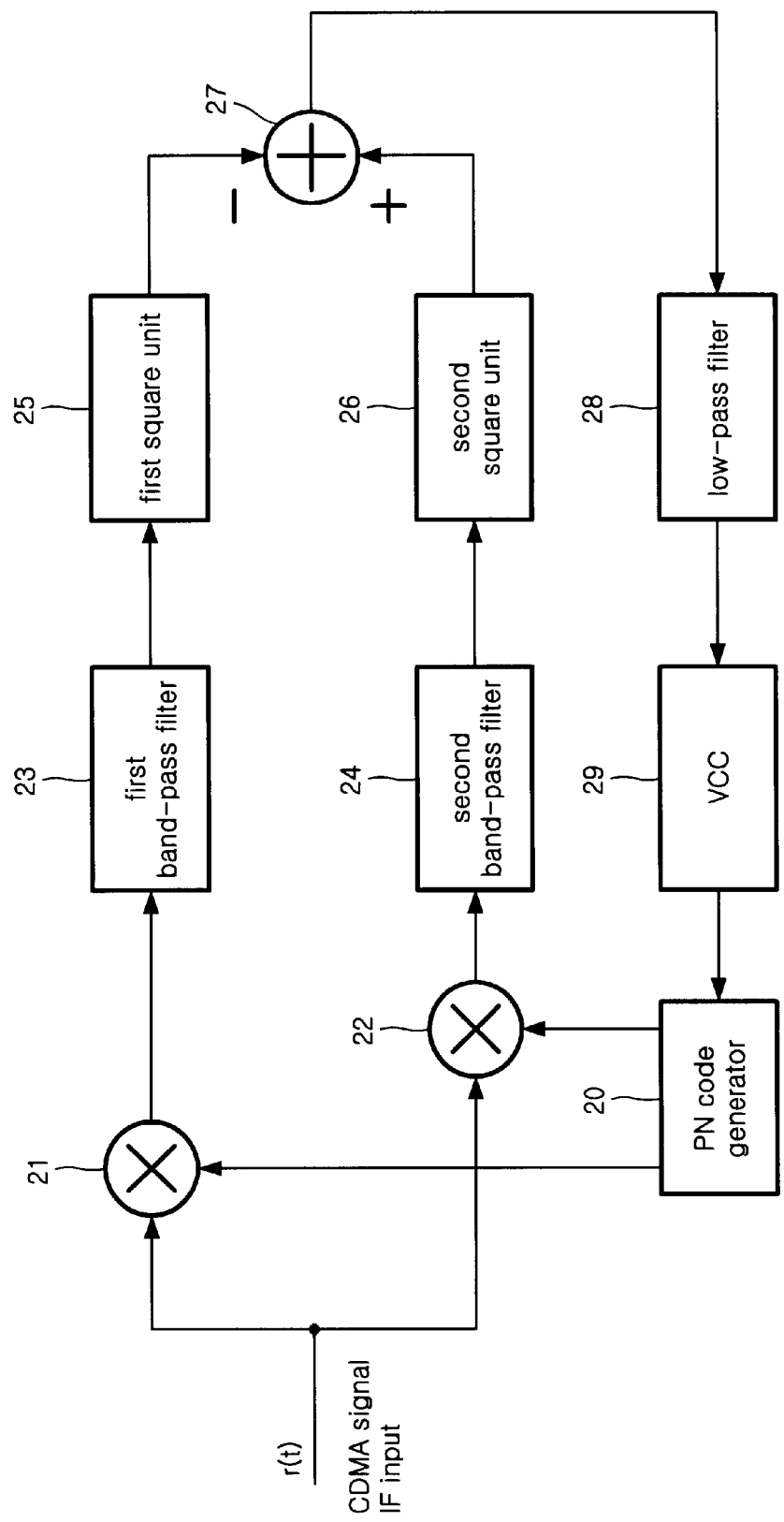
FIG. 3 is a view of an embodiment of an asynchronous DLL in the typical CDMA type mobile communication system.
Figure 4:
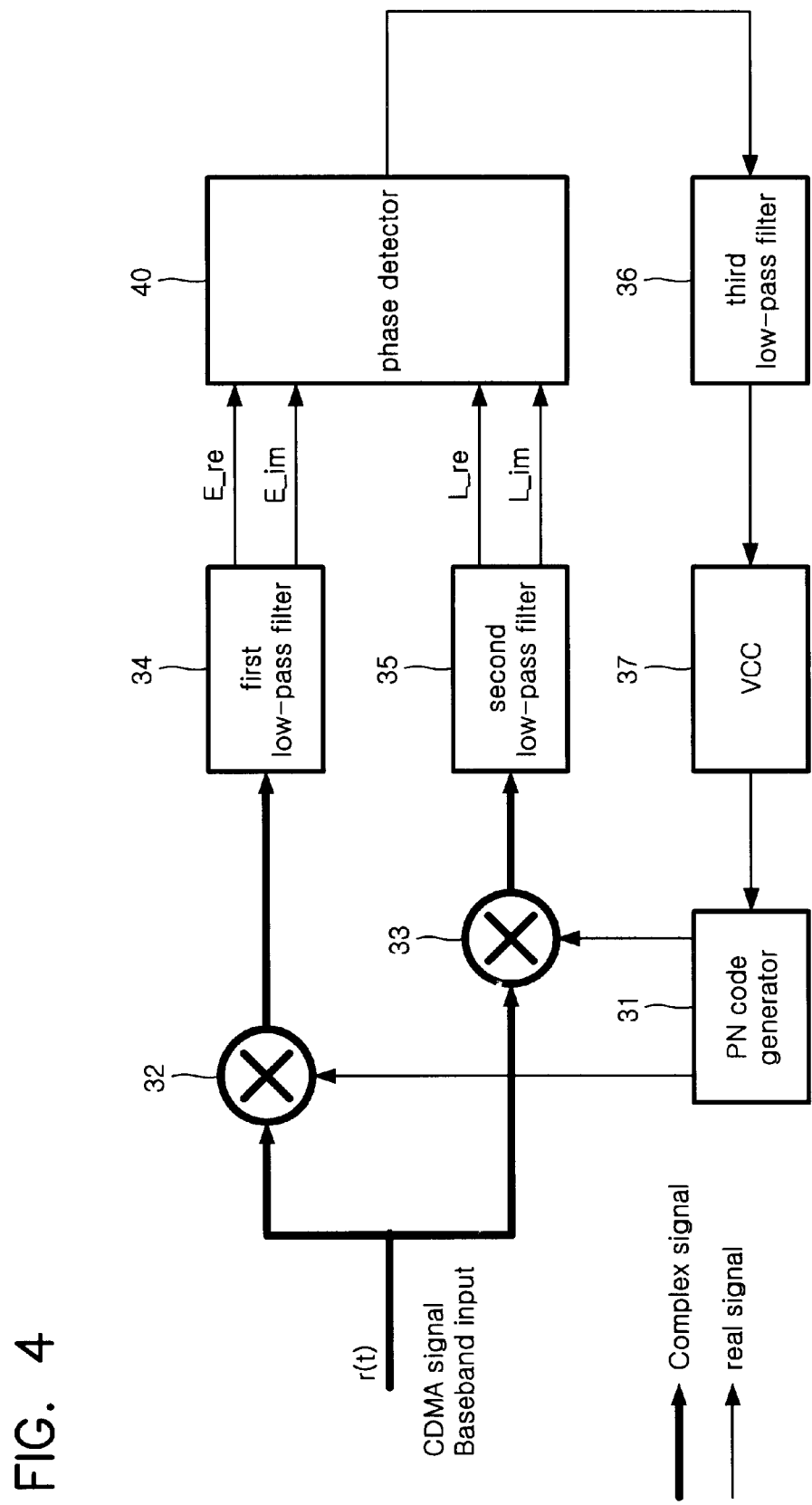
FIG. 4 is a view of another embodiment of the asynchronous DLL in the typical CDMA type mobile communication system.

The present invention will now be described in detail in connection with preferred embodiments with reference to the accompanying drawings. For reference, like reference characters designate corresponding parts throughout several views.

Embodiment 1

Figure 6:
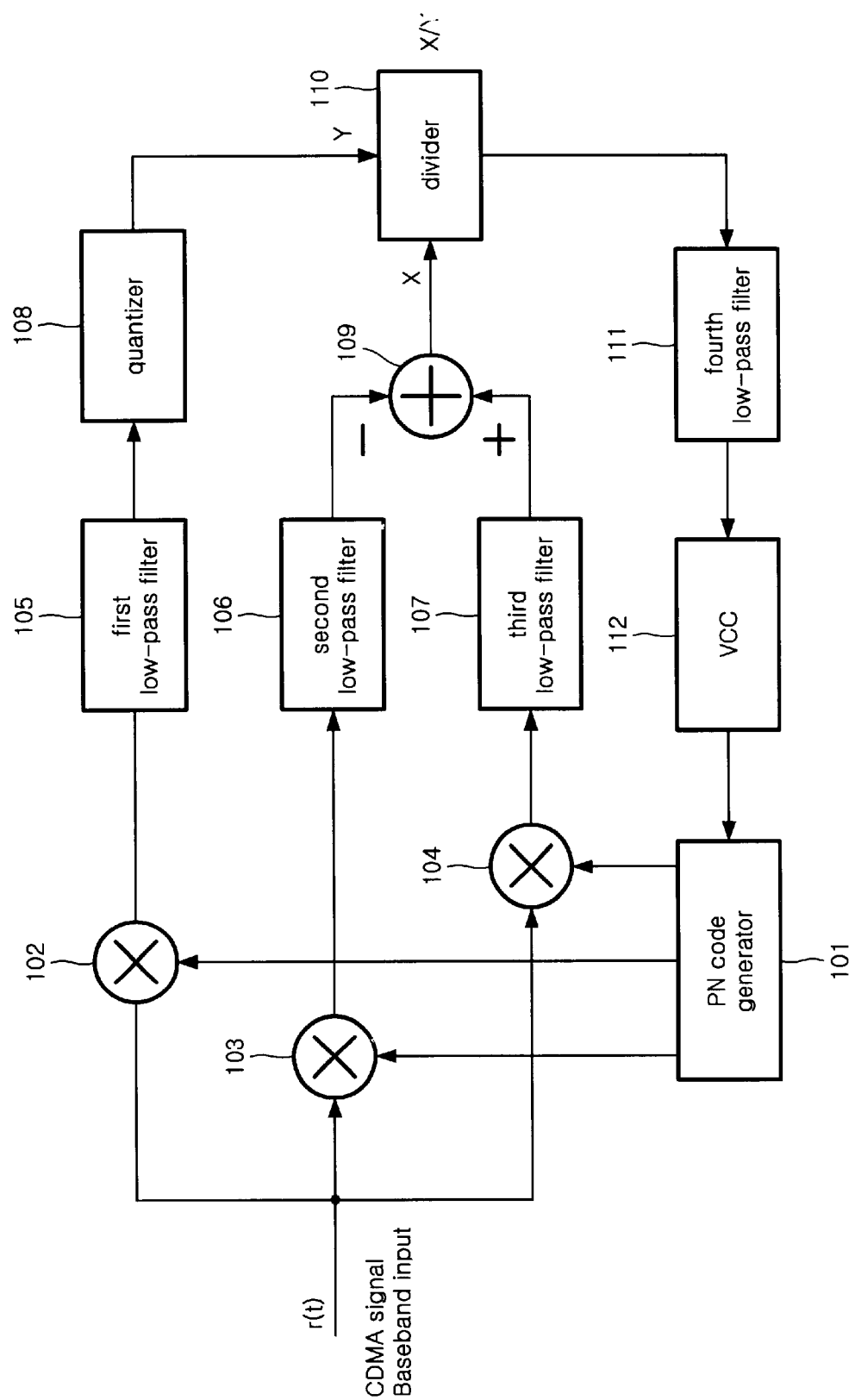
FIG. 6 is a view of a first preferred embodiment of a CDMA (Code Division Multiple Access) code timing tracking apparatus according to the present invention.

FIG. 6 shows a first preferred embodiment of a CDMA (Code Division Multiple Access) code timing tracking apparatus according to the present invention.

Here, the reference numeral 101 indicates a PN code generator for generating on-time code, early code, which is faster than the on-time code, and late code, which is later than the on-time code, 102 indicates a first correlator for correlating the on-time code generated from the PN code generator 101 with baseband CDMA signal (r(t)), which is input, 103 indicates a second correlator for correlating the early code generated from the PN code generator 101 with the baseband CDMA signal (r(t)), and 104 indicates a third correlator for correlating the late code generated from the PN code generator 101 with the baseband CDMA signal (r(t)).

Furthermore, the reference numerals 105 to 107 indicate first to third low-pass filters for low-pass filtering output signal of the first to third correlators 102 to 104 respectively, 108 indicates a quantizer for quantizing the output signal of the first low-pass filter 105, 109 indicates a subtracter for subtracting the output signal of the third low-pass filter 107 from the output signal of the second low-pass filter 106 and generating difference signal, and 110 indicates a divider for dividing the output signal of the subtracter 109 by the output signal of the quantizer 108 and generating its result value as error signal.

The reference numeral 111 indicates a fourth low-pass filter for low-pas filtering the output signal of the divider, 112 indicates a voltage-to-current converter for converting the output signal of the fourth low-pass filter 111 into current and transmitting to the PN code generator 101.

In the first embodiment, the CDMA code timing tracking apparatus according to the present invention generates on-time code, which is synchronized with signal received from the PN code generator 101, early code, which is faster than the on-time code, and late code, which is later than the on-time code.

The first correlator 102 correlates the on-time code generated from the PN code generator 101 with baseband CDMA signal (r(t)), which is input. The second correlator 103 correlates the early code generated from the PN code generator 101 with the baseband CDMA signal (r(t)). Furthermore, third correlator 104 correlates the late code generated from the PN code generator 101 with the baseband CDMA signal (r(t)).

Next, the first to third low-pass filters 105 to 107 low-pass filter the output signal of the first to third correlators 102 to 104 respectively.

The subtracter 109 subtracts the output signal of the third low-pass filter 107 from the output signal of the second low-pass filter 106, generates difference signal, and inputs in the divider 110. The quantizer 108 quantizes the output signal of the first low-pass filter 105.

The structure and function of the quantizer 108 will be described hereinafter in more detail.

Figure 7:
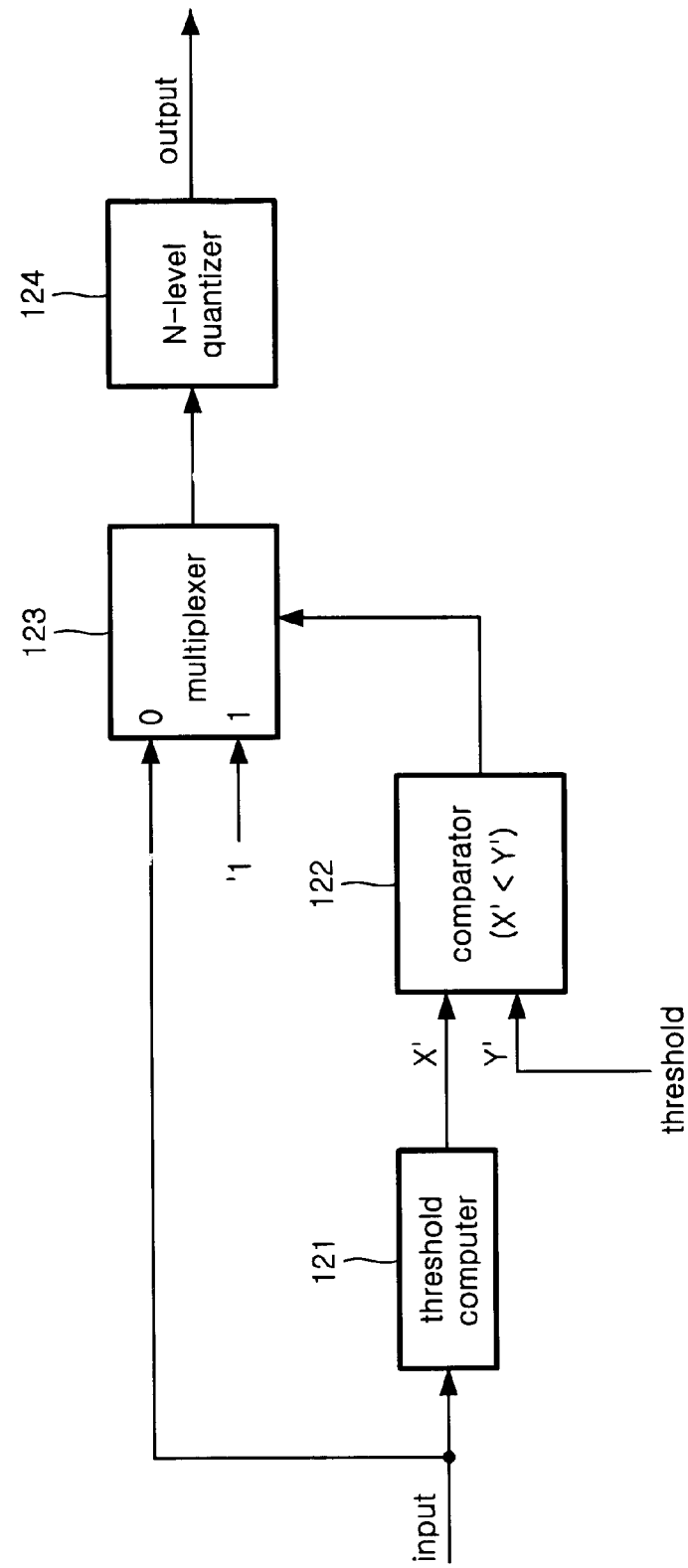
FIG. 7 is a view of an embodiment of quantizing part of FIG. 6.

FIG. 7 shows an embodiment of the quantizer 108.

As shown in the drawing, the quantizer 108 includes an absolute value computer 121 for computing absolute value from the output signal of the first low-pass filter 105, a comparator 122 for comparing the output signal of the absolute value computer 121 and preset threshold and generating selection signal to select one of input signal and preset signal "1" according to the compared result, a multiplexer 123 for selecting and outputting one of the input signal and the signal preset as "1" according to the output signal of the comparator 122, and an N-level quantizer 124 for quantizing the output signal of the multiplexer 123 to N-level.

The quantizer 108 having the above structure computes absolute value of the output signal of the first low-pass filter 105 in the absolute value computer 121. The comparator 122 compares the output signal (X') of the absolute value computer 121 and preset threshold (Y') and generates selection signal to select one of the input signal and the preset signal ("1") according to the compared result.

The multiplexer 123 selects and outputs one of the input signal and the signal preset as "1" according to the selection signal output from the comparator 122. For example, the comparator 122, if the output signal X' is smaller than the preset threshold Y', generates selection signal to select input signal, but if the output signal X' is not smaller than the preset threshold Y', generates selection signal to select the preset signal.

According to the selection signal, the multiplexer 123 selects and outputs the input signal or the preset signal, and the selected and output signal is quantized in the N-level quantizer 124 and transmitted to the divider 110.

Here, the reason of quantization is to simplify hardware when difference of early-late correlation value is divided by quantized signal. That is, the quantization level is implemented into the second power and processed to variable shift operation without division.

Next, the divider 110 divides (X/Y) the output signal (X) of the subtracter 109 by output signal (Y) of the quantizer 108 and generates the resulted value into error signal.

After setting threshold, it can be formularized as follows:

$$e(\tau) = \frac{R\left(\tau - \frac{1}{2}\Delta\right) - R\left(\tau + \frac{1}{2}\Delta\right)}{Q[R(\tau)]}, \text{ if } |R(\tau)| < \text{threshold}$$

$$e(\tau) = R\left(\tau - \frac{1}{2}\Delta\right) - R\left(\tau + \frac{1}{2}\Delta\right), \text{ otherwise.}$$

Formula 3

In the above, the threshold is set not to perform division when the size of R(τ) is near the value "0" and to prevent signal amplification.

As shown in the formula 3, it will be understood that the threshold is not concerned with the electric power P(τ) of input signal. The formula 3 is indicated in the form of S character like the dotted line of FIG. 11.

Next, the fourth low-pass filter 111 low-pass filters output signal of the divider 110. The voltage-to-current converter 112 converts output signal of the fourth low-pass filter 111 into current and transmits to the PN code generator 101 to compensate error.

Embodiment 2

Figure 8:
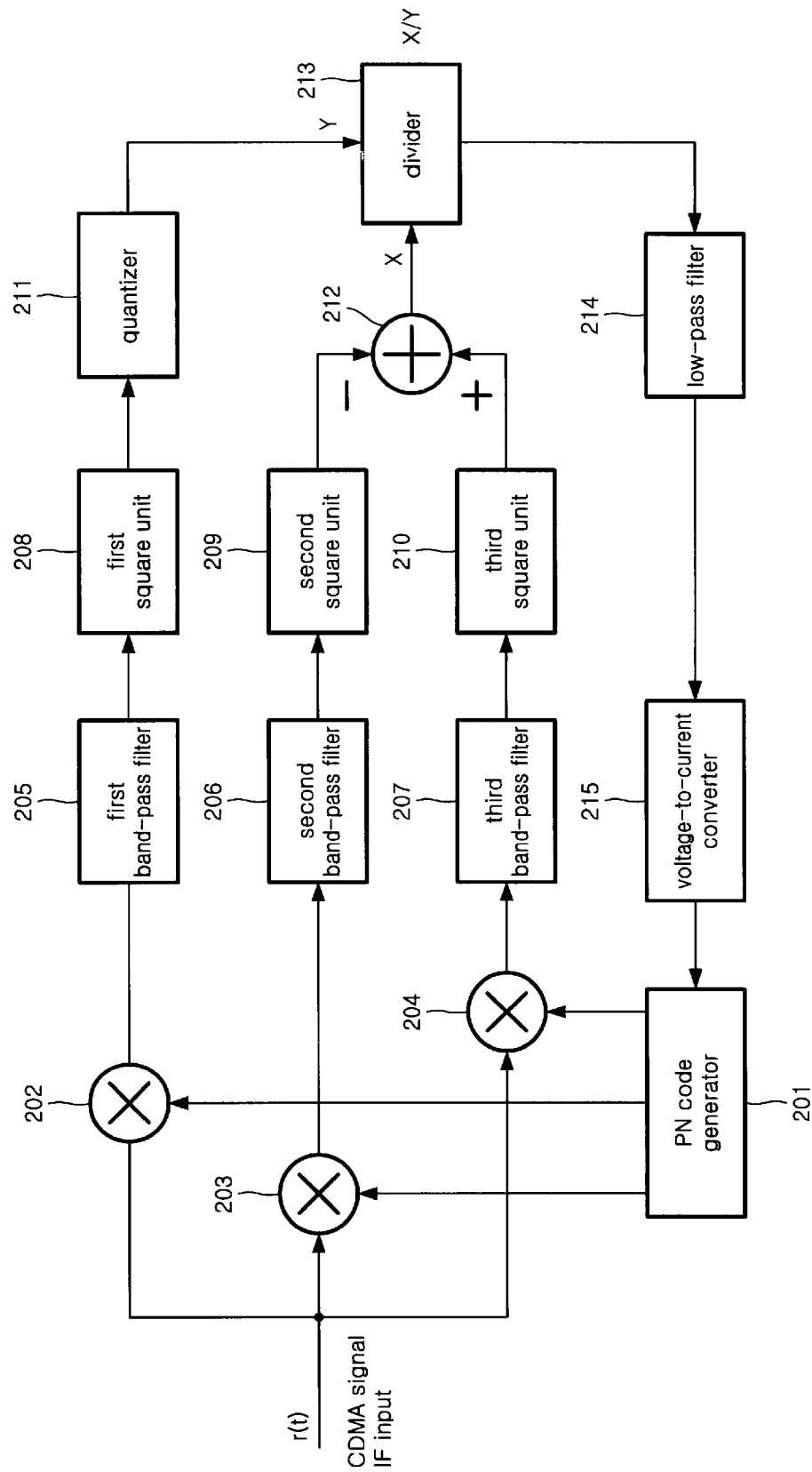
FIG. 8 is a view of a second preferred embodiment of the CDMA code timing tracking apparatus according to the present invention.

FIG. 8 shows a second preferred embodiment of the CDMA code timing tracking apparatus according to the present invention.

Here, the reference numeral 201 indicates a PN code generator for generating on-time code, early code which is faster than the on-time code and late code which is later than the on-time code, 202 indicates a first correlator for correlating the on-time code generated from the PN code generator 201 and CDMA immediate frequency signal, which is input, 203 indicates a second correlator for correlating the early code generated from the PN code generator 201 and the CDMA immediate frequency signal, and 204 indicates a third correlator for correlating the late code generated from the PN code generator 201 and the CDMA immediate frequency signal.

Moreover, the reference numerals 205 to 207 indicate first to third band-pass filters for band-pass filtering output signal of the first to third correlators 202 to 204 respectively, and 208 to 210 indicate square units for squaring the output signal of the first to third band-pass filters 205 to 207 respectively.

Furthermore, the reference number 211 indicates a quantizer for quantizing output signal of the square unit 208, 212 indicates a subtracter for subtracting the output signal of the third square unit 210 from the output signal of the second square unit 209 and generating difference signal, and 213 indicates a divider for dividing the output signal of the subtracter 212 by the output signal of the quantizer 211 and generating its result value as error signal.

Additionally, the reference numeral 214 indicates a low-pass filter for low-pas filtering the output signal of the divider 213, and 215 indicates a voltage-to-current converter for converting the resulted value filtered in the low-pass filter 214 into current and transmitting to the PN code generator 201.

In the second embodiment, the CDMA code timing tracking apparatus according to the present invention generates on-time code, which is synchronized with signal received from the PN code generator 201, early code, which is faster than the on-time code, and late code, which is later than the on-time code.

The first correlator 202 correlates the on-time code generated from the PN code generator 201 with the CDMA intermediate frequency signal. The second correlator 203 correlates the early code generated from the PN code generator 201 with the CDMA intermediate frequency signal. Furthermore, third correlator 204 correlates the late code generated from the PN code generator 201 with the CDMA intermediate frequency signal.

Next, the first to third band-pass filters 205 to 207 low-pass filter each output signal of the first to third correlators 202 to 204 into preset band. The first to third square units 208 to 210 square the output signal of the first to third band-pass filters 205 to 207 respectively.

Moreover, the subtracter 212 subtracts the output signal of the third square unit 210 from the output signal of the second square unit 209 and generates difference signal (X).

Furthermore, the quantizer 211 quantizes the output signal of the first square unit 208, wherein the square unit 211 has the same structure and function as FIG. 7.

Next, the divider 213 divides the output signal (X) of the subtracter 212 by the output signal (Y) of the quantizer 211.

That is, the error signal is not concerned with the size of the input signal by normalizing the early-late correlation value with the on-time correlation value, and it can be formularized as follows:

$$e(\tau) = \frac{R^2\left(\tau - \frac{1}{2}\Delta\right) - R^2\left(\tau + \frac{1}{2}\Delta\right)}{Q[R(\tau)]}, \text{ if } |R^2(\tau)| < \text{threshold}$$

$$e(\tau) = R^2\left(\tau - \frac{1}{2}\Delta\right) - R^2\left(\tau + \frac{1}{2}\Delta\right), \text{ otherwise.}$$

Formula 4

Figure 11:
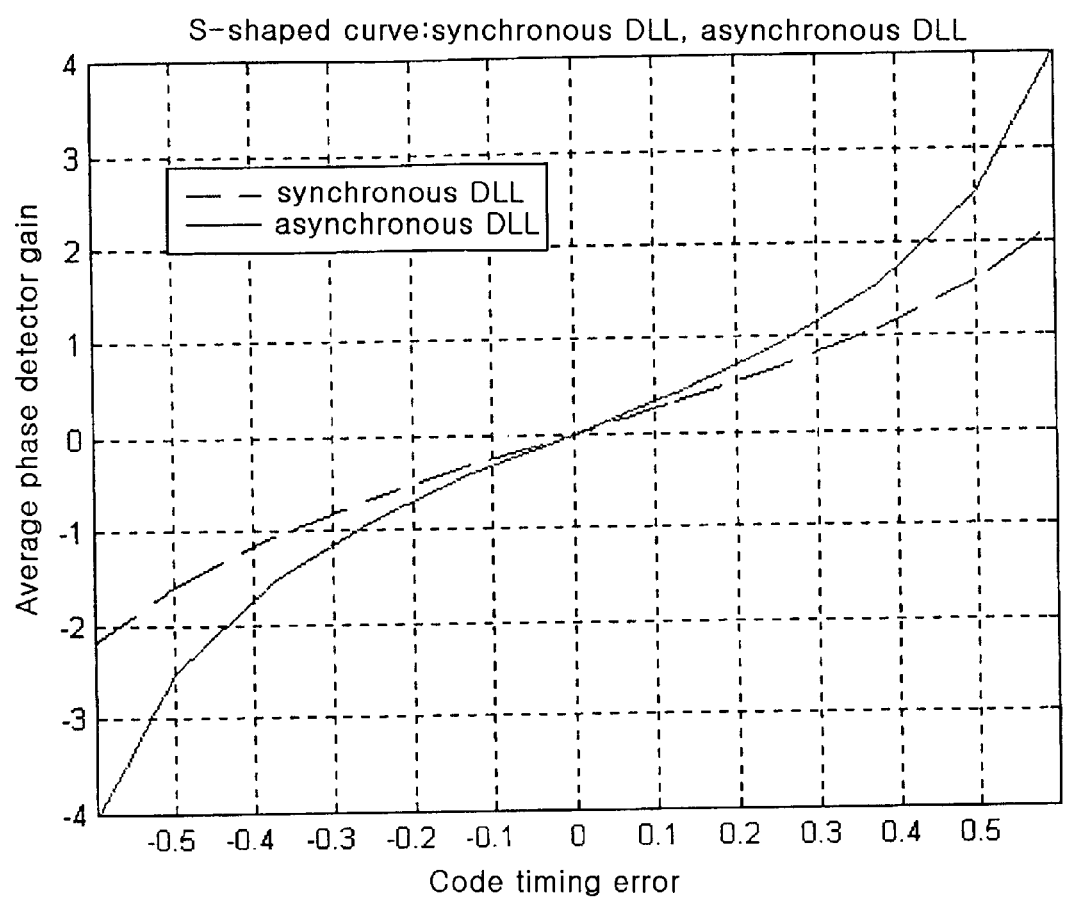
FIG. 11 is a graph of output timing of the phase detector of FIGS. 6, 8 and 9.

Like the formula 3, also in the formula 4, the value of $R^2(\tau)$ is made not to be divided near the value "0". In FIG. 11, the formula 4 is shown in S-shaped curve of a solid line.

Next, the low-pass filter 214 low-pass filters the output signal of the divider 213. The voltage-to-current converter 215 converts the resulted value filtered in the low-pass filter 214 into current and transmits to the PN code generator 201 to compensate error.

Embodiment 3

Figure 9:
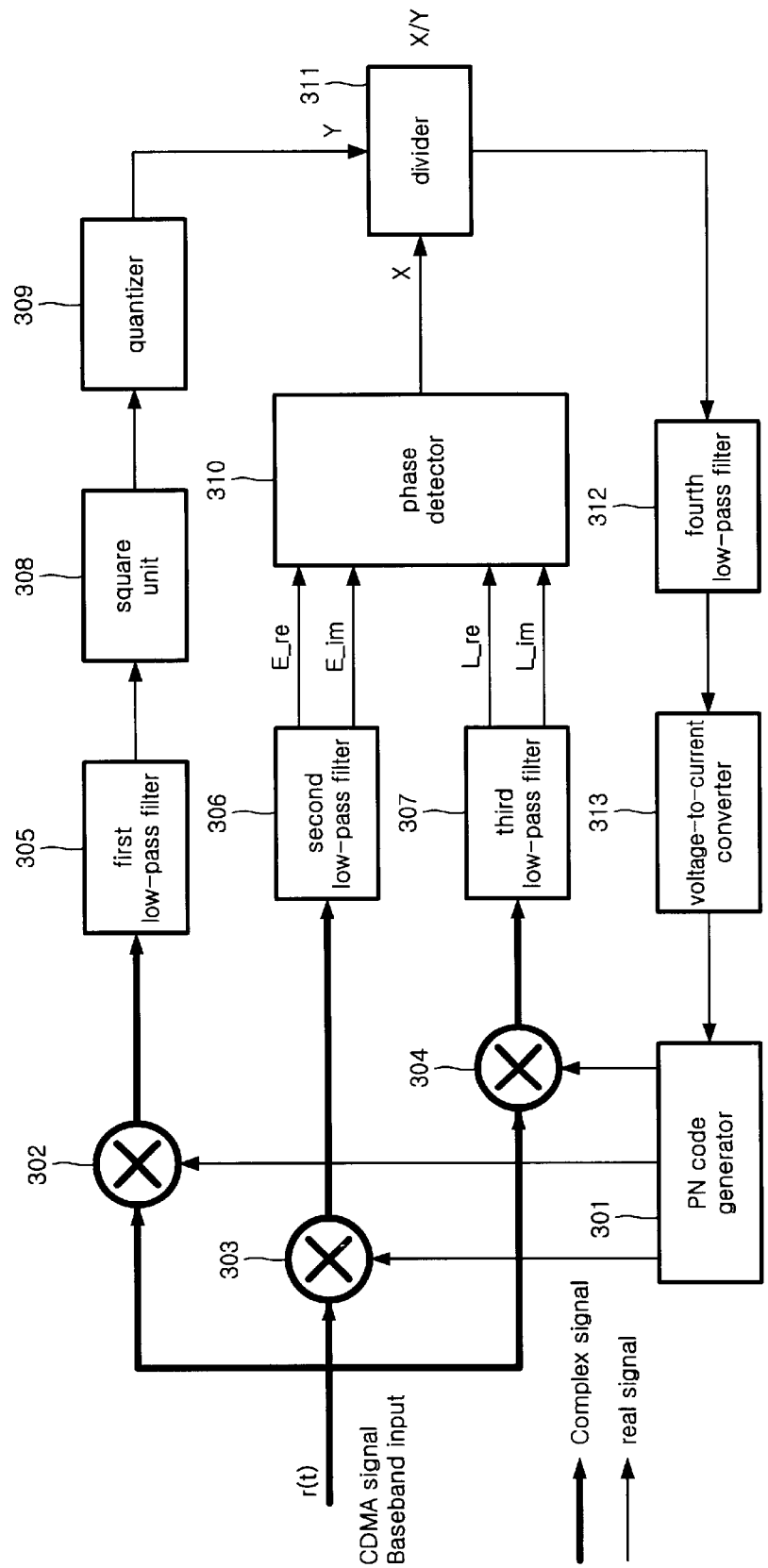
FIG. 9 is a view of a third preferred embodiment of the CDMA code timing tracking apparatus according to the present invention.

FIG. 9 shows a structure of a third preferred embodiment of the CDMA code timing tracking apparatus according to the present invention. That is, FIG. 9 illustrates the CDMA code timing tracking apparatus, in which baseband CDMA signal is input in the place of intermediate frequency signal of the second embodiment.

Here, the reference numeral 301 indicates a PN code generator for generating on-time code, early code, which is faster than the on-time code, and late code, which is later than the on-time code, 302 indicates a first correlator for correlating the on-time code generated from the PN code generator 301 with real part signal and imaginary part signal of baseband CDMA signal, which is input, respectively, 303 indicates a second correlator for correlating the early code generated from the PN code generator 301 with real part signal and imaginary part signal of the baseband CDMA signal respectively, and 304 indicates a third correlator for correlating the late code generated from the PN code generator 301 with real part signal and imaginary part signal of the baseband CDMA signal respectively.

Furthermore, the reference numerals 305 to 307 indicate first to third low-pass filters for low-pass filtering the output signal of the first to third correlators 302 to 304 respectively, 308 indicates a square unit for squaring the output signal of the first low-pass filter 305, 309 indicates a quantizer for quantizing the output signal of the square unit 308.

Moreover, the reference numeral 310 indicates a phase detector for detecting the phase difference between the output signal of the second and third low-pass filters 306 and 307, 311 indicates a divider for dividing the output signal of the phase detector 310 by the output signal of the quantizer 309 and generating its result value as error signal, 312 indicates a fourth low-pass filter for low-pass filtering the output signal of the divider 311, and 313 indicates a voltage-to-current converter for converting the output signal of the fourth low-pass filter 312 and transmitting to the PN code generator 301 to compensate error.

In the third embodiment, the CDMA code timing tracking apparatus according to the present invention, first, generates on-time code, early code, which is faster than the on-time code, and late code, which is later than the on-time code, in the PN code generator 301.

The first correlator 302 correlates the on-time code generated from the PN code generator 301 with real part signal and imaginary part signal of baseband CDMA signal, which is input, respectively. If being QPSK-modulated signal, the input CDMA signal may be classified into real part signal and imaginary part signal, and therefore, the first correlator 302 has two multipliers inside: one being to correlate the on-time code with the real part signal element; and the other being to correlate the on-time code with the imaginary part signal element.

The second correlator 303 correlates the early code of the PN code generator 301, which is faster than the on-time code, with real part signal and imaginary part signal of the baseband CDMA signal respectively. If being QPSK-modulated signal, the input baseband CDMA signal may be classified into real part signal and imaginary part signal, and therefore, the second correlator 303 has two multipliers inside: one being to correlate the on-time code with the real part signal element; and the other being to correlate the on-time code with the imaginary part signal element.

Furthermore, also the third correlator 304 correlates the late code of the PN code generator 301, which is later than the on-time code, with real part signal and imaginary part signal of the baseband CDMA signal respectively. If being QPSK-modulated signal, the input baseband CDMA signal may be classified into real part signal and imaginary part signal, and therefore, the third correlator 304 has two multipliers inside: one being to correlate the on-time code with the real part signal element; and the other being to correlate the on-time code with the imaginary part signal element.

Next, the first to third low-pass filters 305 to 307 low-pass filter the output signal of the first to third correlators 302 to 304 respectively to remove noise and high frequency element.

The square unit 308 squares the output signal of the first low-pass filter 305, and the quantizer 309 quantizes the output signal of the square unit 308. Here, the inside structure and the function of the quantizer are the same as the quantizer shown in FIG. 7.

Meanwhile, the phase detector 310 detects phase difference between the output signals of the second and third low-pass filters 306 and 307.

The operation of the phase detector 310 will be described hereinafter in more detail.

Figure 10:
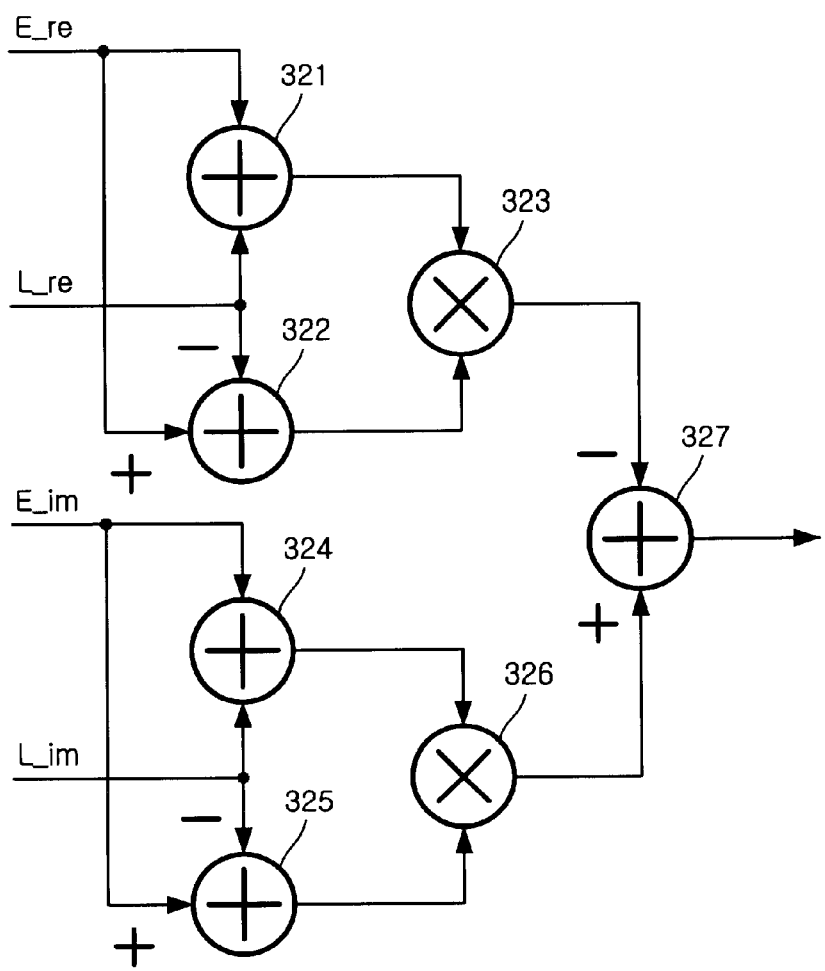
FIG. 10 is a view of an embodiment of a phase detector of FIG. 9.

FIG. 10 shows a preferred embodiment of the phase detector 310. As shown in FIG. 10, the phase detector 310 includes a first adder 321 for adding real part signal output from the second low-pass filter 306 and real part signal output from the third low-pass filter 307, a first subtracter 322 for subtracting real part signal of the third low-pass filter 307 from real part signal of the second low-pass filter 306, a first multiplier 323 for multiplying output signal of the first adder 321 by output signal of the first subtracter 322, a second adder 324 for adding imaginary part signal output from the second low-pass filter 306 and imaginary part signal output from the third low-pass filter 307, a second subtracter 325 for subtracting imaginary part signal output from the third low-pass filter 307 from imaginary part signal output from the second low-pass filter 306, and a second multiplier 326 for multiplying output signal of the second adder 324 and the output signal of the first adder 325, and a third adder 327 for adding the output signal of the first multiplier 323 and output signal of the second multiplier 326.

The phase detector 310 having the above structure, first, adds real part signal (E_re) output from the second low-pass filter 306 and real part signal (L_re) output from the third low-pass filter 307 in the first adder 321 and subtracts real part signal (L_re) output from the third low-pass filter 307 from the real part signal (E_re) output from the second low-pass filter 306 in the first subtracter 322.

The first multiplier 323 multiplies the output signal of the first adder 321 and the output signal of the first subtracter 322.

Next, the second adder 324 adds imaginary part signal (E_im) output from the second low-pass filter 306 and imaginary part signal (L_im) output from the third low-pass filter 307, and the second subtracter 325 subtracts imaginary part signal (L_im) output from the third low-pass filter 307 from imaginary part signal (E_im) output from the second low-pass filter 306.

The second multiplier 326 multiplies the output signal of the second adder 324 and the output signal of the second subtracter 325.

Then, the third adder 327 adds the output signal of the first multiplier 323 and the output signal of the second multiplier 326 and transmits the resulted value as phase detecting signal (X) to the divider 311.

The divider 311 divides (X/Y) the output signal (X) of the phase detector 310 by the output signal (Y) of the quantizer 309 and generates the resulted value as error signal.

Additionally, the fourth low-pass filter 312 low-pass filters the output signal of the divider 311, and the voltage-to-current converter 313 coverts the output signal of the fourth low-pass filter 312 into current and transmits to the PN code generator 301 to compensate error.

Figure 5:
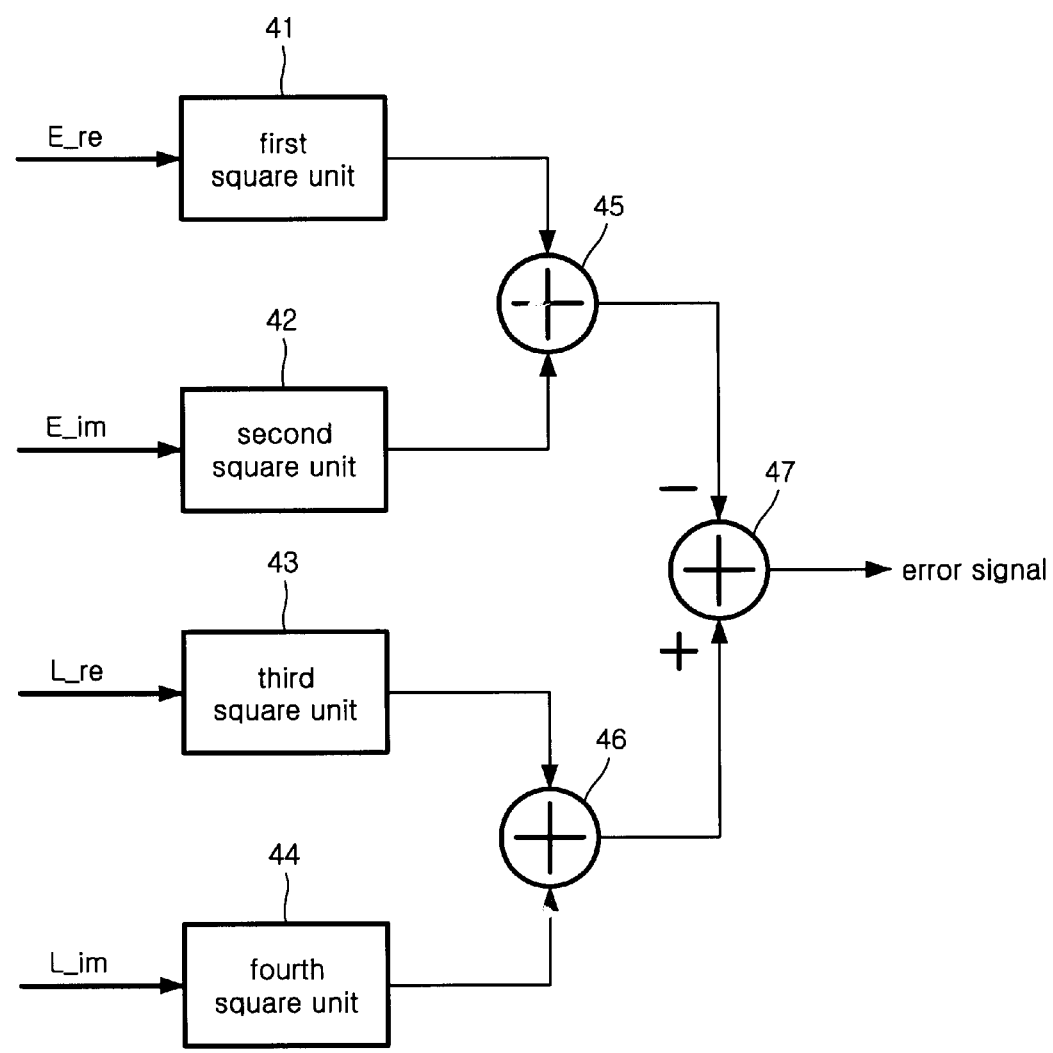
FIG. 5 is a view of an embodiment of a phase detector of FIG. 4.

Compared with a conventional phase detector of an asynchronous DLL (Delay Locked Loop) (see FIG. 5), the phase detector shown in FIG. 10 requires only two multipliers, and thereby the complexity of the conventional phase detector in implementation of hardware can be solved.

According to the present invention, the CDMA code timing tracking apparatus has an advantage that facilitates exact code timing synchronization without regard to signal gain change by normalizing signal gain to synchronize code timing.

Furthermore, the CDMA code timing tracking apparatus has another advantage that makes the implementation of hardware easy by considerably reducing the number of the multipliers in comparison with the conventional phase detector.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A CDMA (Code Division Multiple Access) code timing tracking apparatus comprising:
   a PN code generator for generating on-time code, early code, which is faster than the on-time code, and late code, which is later than the on-time code;
   a first correlator for correlating the on-time code generated from the PN code generator with baseband CDMA signal, which is input;
   a second correlator for correlating the early code generated from the PN code generator with the baseband CDMA signal;
   a third correlator for correlating the late code generated from the PN code generator 101 with the baseband CDMA signal;
   first to third low-pass filters for low-pass filtering output signal of the first to third correlators respectively;
   a quantizer for quantizing the output signal of the first low-pass filter;
   a subtracter for subtracting the output signal of the third low-pass filter from the output signal of the second low-pass filter and generating difference signal;
   a divider for dividing the output signal of the subtracter by the output signal of the quantizer and generating its result value as error signal;
   a fourth low-pass filter for low-pas filtering the output signal of the divider; and
   a voltage-to-current converter for converting the output signal of the fourth low-pass filter into current and transmitting it to the PN code generator.

2. The apparatus as claimed in claim 1, wherein the quantizer includes:
   an absolute value computer for computing absolute value from the output signal of the first low-pass filter;
   a comparator for comparing the output signal of the absolute value computer and preset threshold, the comparator generating selection signal to select one of input signal and preset signal "1" according to the compared result;
   a multiplexer for selecting and outputting one of the input signal and the signal preset as "1" according to the output signal of the comparator; and
   an N-level quantizer for quantizing the output signal of the multiplexer to N-level.

3. The apparatus as claimed in claim 2, wherein the N-level quantizer implements the quantization level to the second power and processes with variable shift operation without division.

4. A CDMA (Code Division Multiple Access) code timing tracking apparatus comprising:
   a PN code generator for generating on-time code, early code, which is faster than the on-time code, and late code, which is later than the on-time code;
   a first correlator for correlating the on-time code generated from the PN code generator and CDMA intermediate frequency signal, which is input;
   a second correlator for correlating the early code generated from the PN code generator and the CDMA intermediate frequency signal;
   a third correlator for correlating the late code generated from the PN code generator and the CDMA intermediate frequency signal;
   first to third band-pass filters for band-pass filtering output signal of the first to third correlators respectively;
   first to third square units for squaring the output signal of the first to third band-pass filters respectively;
   a quantizer for quantizing output signal of the first square unit;
   a subtracter for subtracting the output signal of the third square unit from the output signal of the second square unit and generating difference signal;
   a divider for dividing the output signal of the subtracter by the output signal of the quantizer and generating its result value as error signal;
   a low-pass filter for low-pas filtering the output signal of the divider; and
   a voltage-to-current converter for converting the resulted value filtered in the low-pass filter into current and transmitting to the PN code generator.

5. The apparatus as claimed in claim 4, wherein the quantizer includes:
   an absolute value computer for computing absolute value from the output signal of the first square unit;
   a comparator for comparing the output signal of the absolute value computer and preset threshold, the comparator generating selection signal to select one of input signal and preset signal "1" according to the compared result;
   a multiplexer for selecting and outputting one of the input signal and the signal preset as "1" according to the output signal of the comparator; and
   an N-level quantizer for quantizing the output signal of the multiplexer to N-level.

6. The apparatus as claimed in claim 5, wherein the N-level quantizer implements the quantization level to the second power and processes with variable shift operation without division.

7. A CDMA (Code Division Multiple Access) code timing tracking apparatus comprising:
   a PN code generator for generating on-time code, early code, which is faster than the on-time code, and late code, which is later than the on-time code;

a first correlator for correlating the on-time code generated from the PN code generator with real part signal and imaginary part signal of baseband CDMA signal, which is input, respectively;

a second correlator for correlating the early code generated from the PN code generator with real part signal and imaginary part signal of the baseband CDMA signal respectively;

a third correlator for correlating the late code generated from the PN code generator with real part signal and imaginary part signal of the baseband CDMA signal respectively;

first to third low-pass filters for low-pass filtering the output signal of the first to third correlators respectively;

a square unit for squaring the output signal of the first low-pass filter;

a quantizer for quantizing the output signal of the square unit;

a phase detector for detecting the phase difference between the output signal of the second and third low-pass filters;

a divider for dividing the output signal of the phase detector by the output signal of the quantizer and generating its result value as error signal;

a fourth low-pass filter for low-pass filtering the output signal of the divider; and a voltage-to-current converter for converting the output signal of the fourth low-pass filter and transmitting to the PN code generator to compensate error.

8. The apparatus as claimed in claim 7, wherein the first correlator includes first and second multipliers for correlating the on-time code generated from the PN code generator with real part signal and with imaginary part signal of the baseband CDMA signal respectively.

9. The apparatus as claimed in claim 7, wherein the second correlator includes first and second multipliers for correlating the early code, which is faster than the on-time code, generated from the PN code generator with real part signal and with imaginary part signal of the baseband CDMA signal respectively.

10. The apparatus as claimed in claim 7, wherein the third correlator includes first and second multipliers for correlating the late code, which is later than the on-time code, generated from the PN code generator with real part signal and with imaginary part signal of the baseband CDMA signal respectively.

11. The apparatus as claimed in claim 7, wherein the phase detector includes:

a first adder for adding real part signal output from the second low-pass filter an d real part signal output from the third low-pass filter;

a first subtracter for subtracting real part signal of the third low-pass filter from real part signal of the second low-pass filter;

a first multiplier for multiplying output signal of the first adder by output signal of the first subtracter;

a second adder for adding imaginary part signal output from the second low-pass filter and imaginary part signal output from the third low-pass filter;

a second subtracter for subtracting imaginary part signal output from the third low-pass filter from imaginary part signal output from the second low-pass filter;

a second multiplier for multiplying output signal of the second adder and the output signal of the first adder; and a third adder for adding the output signal of the first multiplier and output signal of the second multiplier.

12. The apparatus as claimed in claim 7, wherein the quantizer includes:

an absolute value computer for computing absolute value from the output signal of the first square unit;

a comparator for comparing the output signal of the absolute value computer and preset threshold, the comparator generating selection signal to select one of input signal and preset signal "1" according to the compared result;

a multiplexer for selecting and outputting one of the input signal and the signal preset as "1" according to the output signal of the comparator; and an N-level quantizer for quantizing the output signal of the multiplexer to N-level.

13. The apparatus as claimed in claim 12, wherein the N-level quantizer implements the quantization level to the second power and processes with variable shift operation without division.

* * * * *